United States Patent
Zheng et al.

(10) Patent No.: US 11,900,630 B2
(45) Date of Patent: Feb. 13, 2024

(54) METHOD FOR DETECTING LEAKAGE OF WATER SUPPLY PIPE BASED ON GROUND-PENETRATING RADAR THREE-DIMENSIONAL IMAGE ATTRIBUTE ANALYSIS

(71) Applicant: ZHEJIANG UNIVERSITY, Hangzhou (CN)

(72) Inventors: Feifei Zheng, Hangzhou (CN); Yonggang Shen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 113 days.

(21) Appl. No.: 17/042,213

(22) PCT Filed: May 27, 2020

(86) PCT No.: PCT/CN2020/092532
§ 371 (c)(1),
(2) Date: Sep. 28, 2020

(87) PCT Pub. No.: WO2020/248817
PCT Pub. Date: Dec. 17, 2020

(65) Prior Publication Data
US 2023/0154037 A1     May 18, 2023

(30) Foreign Application Priority Data
Jun. 12, 2019    (CN) .......................... 201910504922.9

(51) Int. Cl.
*G06T 7/73*      (2017.01)
*F17D 5/02*      (2006.01)
(Continued)

(52) U.S. Cl.
CPC .................. *G06T 7/73* (2017.01); *F17D 5/02* (2013.01); *G06T 5/002* (2013.01); *G06T 5/20* (2013.01);
(Continued)

(58) Field of Classification Search
None
See application file for complete search history.

(56) References Cited

U.S. PATENT DOCUMENTS

| | | | |
|---|---|---|---|
| 2007/0090989 A1* | 4/2007 | Weil ........................ | G01S 13/89 250/341.1 |
| 2019/0137653 A1* | 5/2019 | Starr ...................... | B64C 39/024 |
| 2020/0003892 A1* | 1/2020 | Jazayeri ................ | G01S 13/885 |

FOREIGN PATENT DOCUMENTS

| | | |
|---|---|---|
| CN | 103278816 A | 9/2013 |
| CN | 206369816 U | 8/2017 |

(Continued)

OTHER PUBLICATIONS

International Search Report (PCT/CN2020/092532); dated Aug. 4, 2020.
First office action (201910504922.9); dated Jan. 21, 2020.

*Primary Examiner* — Whitney Moore
(74) *Attorney, Agent, or Firm* — W&G Law Group

(57) ABSTRACT

The present disclosure belongs to field of nondestructive testing and positioning of urban water supply pipe leakage in municipal engineering and discloses a method for detecting leakage of water supply pipe based on ground-penetrating radar three-dimensional image attribute analysis including: acquiring ground-penetrating radar original image data of water supply pipe by longitudinal scanning; de-noising and filtering acquired original image data; fitting processed image data into three-dimensional data body by interpolation, extracting multiple planar or stereo image attributes and displaying image attributes by longitudinal, transverse, (Continued)

horizontal, irregular profiles and iso-surface; and accurately identifying and positioning pipe leakage positions and scale by multi-attribute comprehensive analysis. In this disclosure, leakage position is accurately positioned; spectrum with rich information is obtained based on extracted frequency attributes, leakage position is further verified; and high-resolution imaging is performed on leakage features based on extracted amplitude attributes, and the scale of pipe leakage is determined.

5 Claims, 6 Drawing Sheets

(51) Int. Cl.
    *G06T 5/00*     (2006.01)
    *G06T 5/20*     (2006.01)
    *G06T 7/00*     (2017.01)

(52) U.S. Cl.
    CPC .. *G06T 7/0002* (2013.01); *G06T 2207/10044* (2013.01)

(56) References Cited

FOREIGN PATENT DOCUMENTS

| | | |
|---|---|---|
| CN | 107193001 A | 9/2017 |
| CN | 107975678 A | 5/2018 |
| CN | 108286654 A | 7/2018 |
| CN | 108287369 A | 7/2018 |
| CN | 108732628 A | 11/2018 |
| CN | 109031290 A | 12/2018 |
| CN | 110230780 A | 9/2019 |
| DE | 4231882 A1 | 3/1994 |
| RU | 2231037 C1 | 6/2004 |
| RU | 2439519 C1 | 1/2012 |
| TW | 201445121 A | 12/2014 |
| WO | 2011046480 A1 | 4/2011 |

\* cited by examiner

METHOD FOR DETECTING LEAKAGE OF WATER SUPPLY PIPE BASED ON GROUND-PENETRATING RADAR THREE-DIMENSIONAL IMAGE ATTRIBUTE ANALYSIS

TECHNICAL FIELD

The present disclosure relates to the field of nondestructive testing and positioning of leakage of urban water supply pipe in municipal engineering, and in particular, to a method for detecting leakage of a water supply pipe based on ground-penetrating radar three-dimensional image attribute analysis.

BACKGROUND

At present, the existing technology commonly used in the industry is as follows: the management of urban water supply pipes has become a hot issue of social concern. Because of the problems in construction, pipe materials and service time of water supply pipes in China, a problem of water leakage often occurs due to pipe damage. This problem not only leads to a waste of water resources, but also brings some security risks. In order to reduce influences produced by leakage of the water supply pipe, it is necessary to use a method for detecting leakage of a pipe to determine leakage positions. Close to traffic is needed in a distributed optical fiber method, a correlation instrument method, a tracer gas method, a smart ball method and other destructive detection methods that require road excavation, which have a large amount of engineering, are costly, and are difficult to promote in the city. A non-destructive detection method is more necessary in practical application. At present, the most common nondestructive testing method is regular sounding, but this method also has some defects: first, it requires a detection engineer to have a high level of experience in leakage listening, which generally requires more than ten years of experience accumulation; second, it has strict requirements on an environment, and there should be no noise interference during the leakage listening, which generally can work only at night; third, the leakage detection efficiency is low, and a pipeline of more than one kilometer generally takes days to complete. The defects of the regular sounding can no longer meet the increasingly rapid development of urban water supply network construction. As a non-destructive testing method, ground-penetrating radar has attracted much attention due to its advantages of high efficiency, high speed and environmental tolerance.

Ground-penetrating radar is based on the theory of electromagnetic wave propagation and premised on the difference of dielectric (conductivity and dielectric constant), and uses reflection of high-frequency pulse electromagnetic waves to detect a target object. Since the dielectric constant of soil is 6 to 10 and the dielectric constant of water is 81, the difference between the two is huge, theoretically, a leakage area may form an obvious diffraction wave on a radar image, and a leakage point of a pipe network can be found by analyzing and interpreting the diffraction wave on the radar image. However, due to the diversity and complexity of underground media in practical projects, an imaging effect of an image is always affected to different degrees, resulting in weak or disturbed signals of the target object. Information representing leakage on radar images is often difficult to identify. Main problems of an existing radar leakage detection technology are as follows:

(1) information included in the images is single, that is, the images are all waveforms;
(2) the images are displayed in a single way, that is, the images are all profiles; and
(3) the analysis process of the images mainly relies on the experience of engineers, and the accuracy is not stable.

Therefore, how to obtain leakage information from ground-penetrating radar image data and optimize an imaging effect of the ground-penetrating radar image data has become a key problem for ground-penetrating radar to detect pipe leakage. However, under the existing technology, the problems of the images including single information and being displayed in a single way greatly hinder the improvement to the imaging effect of the images, and therefore, the analysis process of the images often relies on the judgment of personal experience. Solving the above problems can not only more efficiently and accurately detect leakage and leakage situations of the pipe, but also facilitate the popularization of ground-penetrating radar in pipe leakage detection.

SUMMARY

In view of the problems in the existing technology, the present disclosure provides a method for detecting leakage of a water supply pipe based on ground-penetrating radar three-dimensional image attribute analysis, which is a method for accurately positioning pipe leakage positions and scale by multi-attribute comprehensive analysis. The method for detecting leakage in the present disclosure is applied to water supply pipes, and can acquire three-dimensional space information of pipe leakage, position leakage positions, and determine the scale of leakage. In terms of pipe leakage detection, the present disclosure changes a traditional ground-penetrating radar two-dimensional image analysis method, and fits image data into a three-dimensional data body around a pipe through radar axial scanning along the pipe and image processing such as DC removal, zero-time correction, amplitude enhancement, and band-pass filtering. Coherent attributes extracted from the constructed three-dimensional image can quantify the similarity of radar waveforms in axial and vertical directions, so as to acquire three-dimensional space information of pipe leakage.

Instantaneous attributes extracted can highlight horizontally continuous slight changes, so as to accurately position leakage positions. Frequency attributes extracted can be used to obtain a spectrum with rich information, which helps to further verify the leakage positions. Amplitude attributes extracted can be used for high-resolution imaging of leakage features, so as to determine the scale of pipe leakage.

The present disclosure is implemented as follows. A method for detecting leakage of a water supply pipe based on ground-penetrating radar three-dimensional image attribute analysis is provided, the method including:

step 1 of acquiring ground-penetrating radar original image data of a water supply pipe by longitudinal scanning;

step 2 of de-noising and filtering the acquired original image data;

step 3 of fitting, by interpolation, the image data that has been processed into a three-dimensional data body; and extracting multiple planar or stereo image attributes, and displaying the image attributes by a longitudinal profile, a transverse profile, a horizontal profile, an irregular profile and iso-surface; and step 4 of accurately identifying leakage positions and scale by multi-attribute comprehensive analysis.

Further, said acquiring ground-penetrating radar original image data in the step 1 includes: selecting a radar antenna with an appropriate center frequency and reasonably arranging pipe axial survey lines. Different pipe burial depths and pipe diameters correspond to different radar antenna frequencies, an appropriate radar antenna model is calculated in advance according to a pipe burial depth and a pipe diameter, and relations between a radar frequency, a horizontal resolution and a vertical resolution are shown in the following formulas:

$$\text{Reflection coefficient } R = \frac{\sqrt{\varepsilon_1} - \sqrt{\varepsilon_2}}{\sqrt{\varepsilon_1} + \sqrt{\varepsilon_2}}$$

$$\text{Horizontal resolution } R_f = \frac{1}{4}\sqrt{\frac{h\lambda}{2}}$$

$$\text{Vertical resolution } R_v = \frac{\lambda}{8} - \frac{\lambda}{4}$$

$$\text{Wave velocity } v = \frac{c}{\sqrt{\varepsilon}} = \lambda f$$

$$\text{Time } t = \frac{2h}{v}$$

For example, a radar antenna with a center frequency of 800 MHz may be selected for a pipe with a burial depth of less than 1 m and a diameter of more than 60 mm. A position of a pipe axis is determined according to a position of a pipe orifice, and the antenna travels at a constant speed along the pipe axis from a starting pipe orifice to an ending pipe orifice, and then back to the starting pipe orifice. Theoretically, a width of an image detected by each track at a burial depth may not be less than half of the depth, so a parallel interval between two adjacent motion trajectories is about half of the burial depth. Multiple parallel trajectories are repeated so, in which the first one is directly above the pipe axis, and then multiple other trajectories run parallel to the first trajectory and symmetrically on left and right sides with equal widths, as shown in FIG. 2. The efficiency of such a collection manner is far greater than that of the traditional horizontal operation manner of being perpendicular to the pipe, as shown in FIG. 3.

Further, the basic processing on the original radar image data in step 2 includes DC removal, zero-time correction, amplitude enhancement and band-pass filtering. Firstly, DC components of acquired original radar image signals are set to zero by using a Subtract-DC-Shift module in a one-dimensional filtering function of a universal radar processing software reflexw, so as to achieve a purpose of removing DC and removing zero drift. Then, a first negative peak value or positive peak value of a direct wave is selected as a zero-time correction point by using a Move start time module in a static correction function of the reflexw, and the time of the position is set to 0. Finally, the amplitudes of weak signals at depth are amplified by using an Energy decay module in a gain function of the reflexw, frequency signals within a particular range are selected by using a bandpassbutterworth module in the one-dimensional filtering function of the reflexw, high-frequency signals are allowed to pass to a maximum extent, and low-frequency signals are attenuated and suppressed.

Further, said fitting a three-dimensional data body in the step 3 includes: firstly, establishing a three-dimensional coordinate system of a radar image by using a software OpendTect based on an amount of to-be-imported radar image data, a total number of tracks of radar data and a total time duration of radar data; secondly, importing the radar image data that has been processed in the step 2 into the software; then confirming arrangement pitch of the survey lines and a track pitch of the radar data during radar collection, inputting pitch-related parameters in a Manipulate module of the software OpendTect, and determining corresponding calculation functions; and finally, completing interpolation of the radar image data through a calculation command, and constructing a three-dimensional space information map of an underground pipe, as shown in FIG. 7.

Further, said multi-attribute analysis in the step 4 includes analysis on coherent attributes, instantaneous attributes, frequency attributes and amplitude attributes. An attribute analysis profile and an attribute analysis type are determined according to a three-dimensional space information map constructed in the step 3, and a corresponding attribute type is selected according to an Attribute module in an analysis function of the OpendTect. Firstly, the coherent attributes are applied to the horizontal profile to quantify similarity of radar waveforms in axial and vertical directions, so as to acquire three-dimensional space information of pipe leakage and obtain a suspected leakage point, as shown in FIG. 8; secondly, the instantaneous attributes are applied to the longitudinal profile to highlight horizontally continuous slight changes, so as to accurately position leakage positions, as shown in FIG. 9; then the frequency attributes are applied to the transverse profile to obtain a spectrum with rich information, so as to help to further verify the leakage positions, as shown in FIG. 10; and finally, the amplitude attributes are applied to the horizontal profile to perform high-resolution imaging on leakage features, so as to determine the scale of pipe leakage, as shown in FIG. 11.

Another objective of the present disclosure is to provide a ground-penetrating radar image processing system using the method for detecting leakage of a water supply pipe based on ground-penetrating radar three-dimensional image attribute analysis.

Based on the above, the present disclosure has the following advantages and positive effects: the method for detecting leakage in the present disclosure is applied to pipes, can acquire three-dimensional space information of pipe leakage and then position pipe leakage positions and leakage scale. In terms of pipe leakage detection, the present disclosure changes a traditional ground-penetrating radar two-dimensional image analysis method. Coherent attributes extracted from the constructed three-dimensional image can quantify the similarity of radar waveforms in axial and vertical directions, so as to acquire three-dimensional space information of pipe leakage. Instantaneous attributes extracted can highlight horizontally continuous slight changes, so as to accurately position leakage positions. Frequency attributes extracted can be used to obtain a spectrum with rich information, which helps to further verify the leakage positions. Amplitude attributes extracted can be used for high-resolution imaging of leakage features, so as to determine the scale of pipe leakage. The method for detecting leakage of a pipe can mine complex and reliable information of ground-penetrating radar images, improve an imaging effect, and thus make the judgment on information such as pipe leakage positions and scale more accurate and efficient. The method for detecting leakage of a pipe in the present disclosure has good effects on the acquisition of three-dimensional space information of pipe leakage, the positioning of pipe leakage positions and the determination of leakage scale.

DESCRIPTION OF EMBODIMENTS

In order to make the objectives, technical solutions and advantages of the present disclosure clearer, the present disclosure is described in further detail as follows with reference to embodiment. It should be understood that specific embodiments described herein are intended only to explain and not to limit the present disclosure.

The present disclosure, by extracting various attribute information of ground-penetrating radar images, can enhance identification of leakage positions and scale and improve an imaging effect, so as to effectively mine complex and reliable information in the data and enhance identification and imaging effects of leakage.

The technical solutions of the present disclosure are described in detail as follows with reference to the accompanying drawings.

Figure 1:
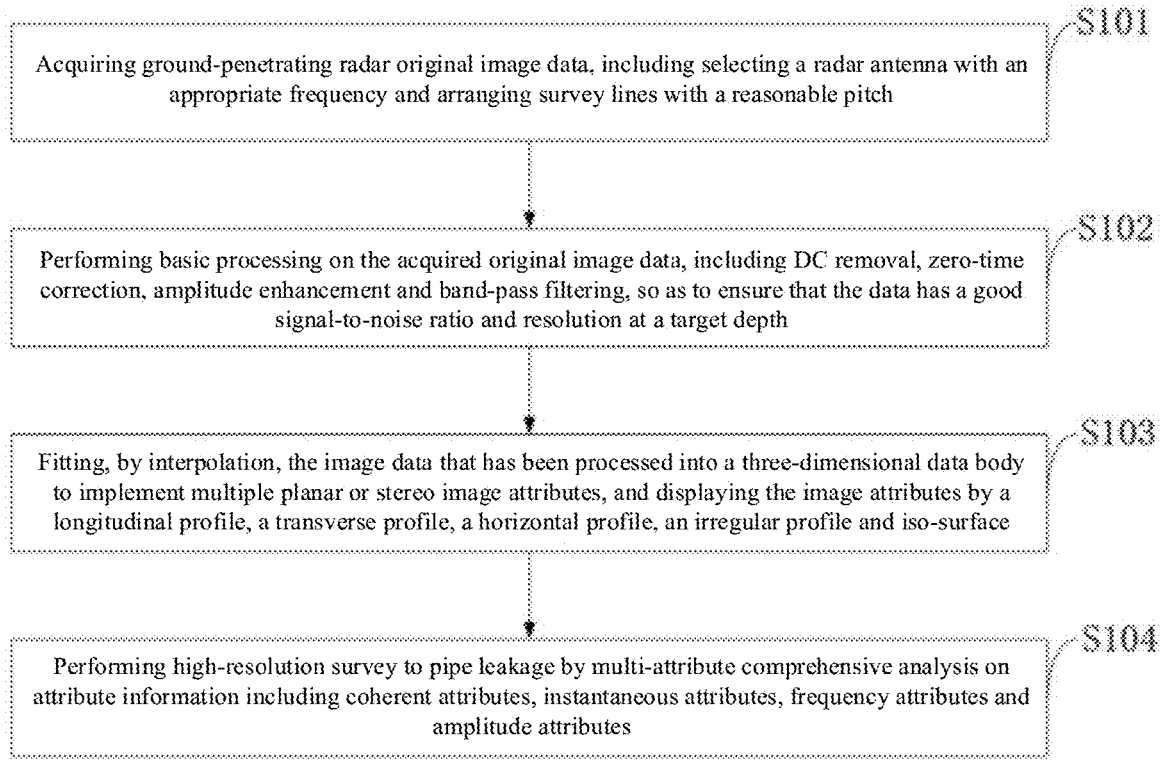
FIG. 1 is a flowchart of a method for detecting leakage of a water supply pipe based on ground-penetrating radar three-dimensional image attribute analysis according to an embodiment of the present disclosure.

As shown in FIG. 1, a method for detecting leakage of a water supply pipe based on ground-penetrating radar three-dimensional image attribute analysis according to an embodiment of the present disclosure includes steps of:

S101: acquiring ground-penetrating radar original image data, including selecting a radar antenna with an appropriate frequency and arranging survey lines with a reasonable pitch;

S102: performing basic processing on the acquired original image data, including DC removal, zero-time correction, amplitude enhancement and band-pass filtering, so as to ensure that the data has a good signal-to-noise ratio and resolution at a target depth;

S103: fitting, by interpolation, the image data that has been processed into a three-dimensional data body to implement multiple planar or stereo image attributes, and displaying the image attributes by a longitudinal profile, a transverse profile, a horizontal profile, an irregular profile and iso-surface; and S104: accurately detecting and positioning pipe leakage by multi-attribute comprehensive analysis on attribute information including coherent attributes, instantaneous attributes, frequency attributes and amplitude attributes.

In a preferred embodiment of the present disclosure, the acquiring ground-penetrating radar original image data includes selecting a radar antenna with an appropriate center frequency and reasonably arranging pipe axial survey lines. Different pipe burial depths and pipe diameters correspond to different radar antenna frequencies, an appropriate radar antenna model is calculated in advance according to a pipe burial depth and a pipe diameter, and relations between a radar frequency, a horizontal resolution and a vertical resolution are shown in the formulas below:

$$\text{Reflection coefficient } R = \frac{\sqrt{\varepsilon_1} - \sqrt{\varepsilon_2}}{\sqrt{\varepsilon_1} + \sqrt{\varepsilon_2}}$$

$$\text{Horizontal resolution } R_f = \frac{1}{4}\sqrt{\frac{h\lambda}{2}}$$

$$\text{Vertical resolution } R_v = \frac{\lambda}{8} - \frac{\lambda}{4}$$

$$\text{Wave velocity } v = \frac{c}{\sqrt{\varepsilon}} = \lambda f$$

$$\text{Time } t = \frac{2h}{v}$$

Figure 2:
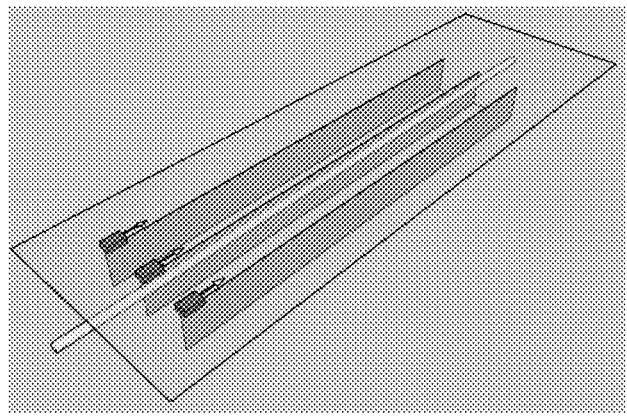
FIG. 2 is a schematic diagram of radar axial collection according to an embodiment of the present disclosure.
Figure 3:
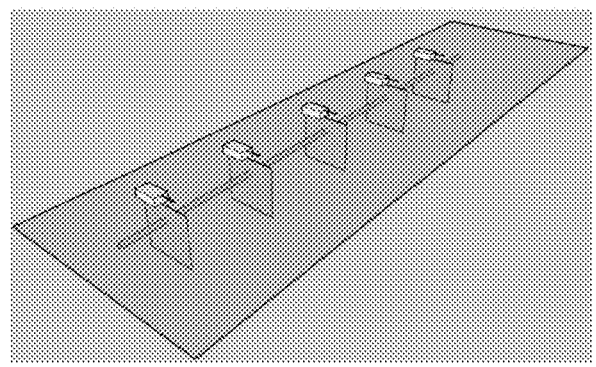
FIG. 3 is a schematic diagram of radar transverse collection according to an embodiment of the present disclosure.

For example, a radar antenna with a center frequency of 800 MHz may be selected for a pipe with a burial depth of less than 1 m and a diameter of more than 60 mm. A position of a pipe axis is determined according to a position of a pipe orifice, and the antenna travels at a constant speed along the pipe axis from a starting pipe orifice to an ending pipe orifice, and then back to the starting pipe orifice. Theoretically, a width of an image detected by each track at a burial depth may not be less than half of the depth, so a parallel interval between two adjacent motion trajectories is about half of the burial depth. Multiple parallel trajectories are repeated so, in which the first one is directly above the pipe axis, and then multiple other trajectories run parallel to the first trajectory and symmetrically on left and right sides with equal widths, as shown in FIG. 2. The efficiency of such a collection manner is far greater than that of the traditional horizontal operation manner of being perpendicular to the pipe, as shown in FIG. 3.

In a preferred embodiment of the present disclosure, the basic processing on the original radar image data includes DC removal, zero-time correction, amplitude enhancement and band-pass filtering. Firstly, DC components of original radar image signals collected are set to zero by using a Subtract-DC-Shift module in a one-dimensional filtering function of a universal radar processing software reflexw, so as to achieve a purpose of removing DC and removing zero drift. Then, a first negative peak value or positive peak value of a direct wave is selected as a zero-time correction point by using a Move start time module in a static correction function of the reflexw, and the time of the position is set to 0. Finally, the amplitudes of weak signals at depth are amplified by using an Energy decay module in a gain function of the reflexw, frequency signals within a particular range are selected by using a bandpassbutterworth module in the one-dimensional filtering function of the reflexw, high-frequency signals are allowed to pass to a maximum extent, and low-frequency signals are attenuated and suppressed.

Figure 7:
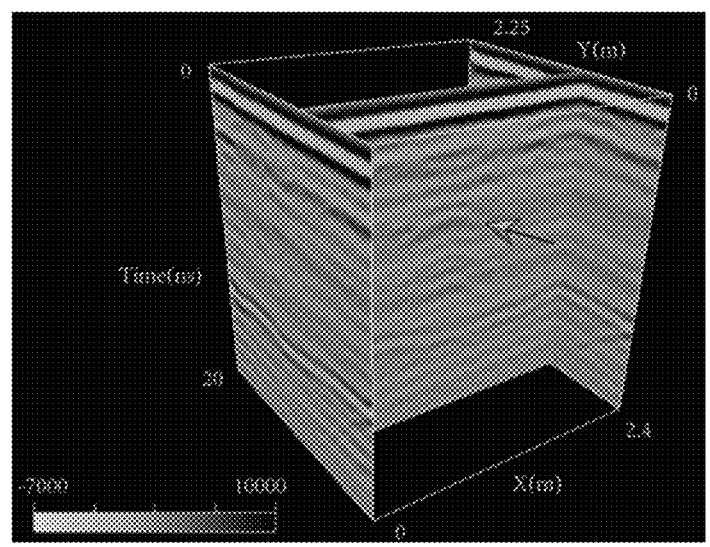
FIG. 7 is a profile of a three-dimensional data body according to an embodiment of the present disclosure.

In a preferred embodiment of the present disclosure, the fitting a three-dimensional data body includes firstly, establishing a three-dimensional coordinate system of a radar image by using a software OpendTect based on an amount of to-be-imported radar image data, a total number of tracks of radar data and a total time duration of radar data; secondly, importing the radar image data that has been processed in step 2 into the software; then confirming arrangement pitch of the survey line and a track pitch of the radar data during radar collection, inputting pitch related parameters in a Manipulate module of the software OpendTect, and determining corresponding calculation functions; and finally, completing interpolation of the radar image data through a calculation command, and constructing a three-dimensional spatial information map of an underground pipe, as shown in FIG. 7.

Figure 8:
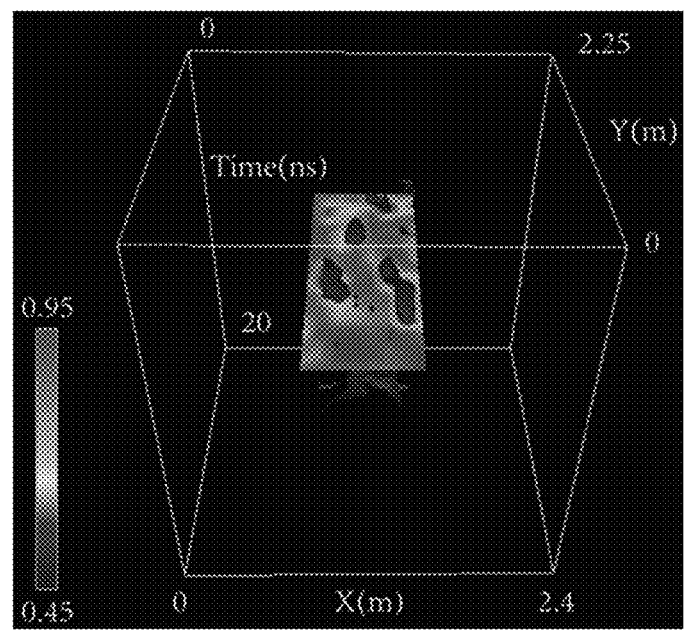
FIG. 8 is a slice map of coherent attributes according to an embodiment of the present disclosure.
Figure 9:
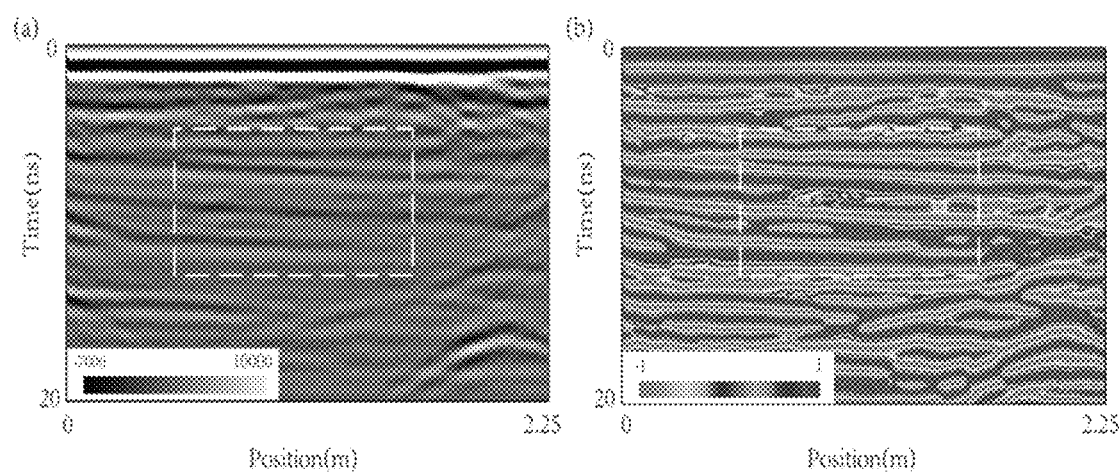
FIG. 9 is a profile of instantaneous properties before and after comparison according to an embodiment of the present disclosure.
Figure 10:
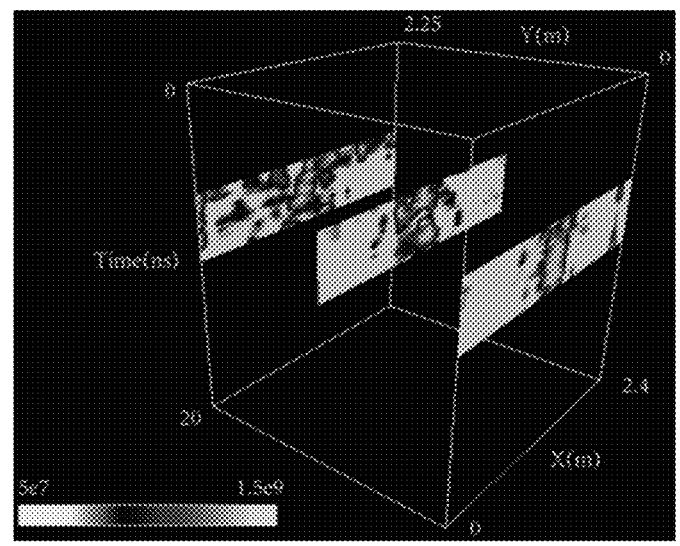
FIG. 10 is a profile of frequency attributes according to an embodiment of the present disclosure.
Figure 11:
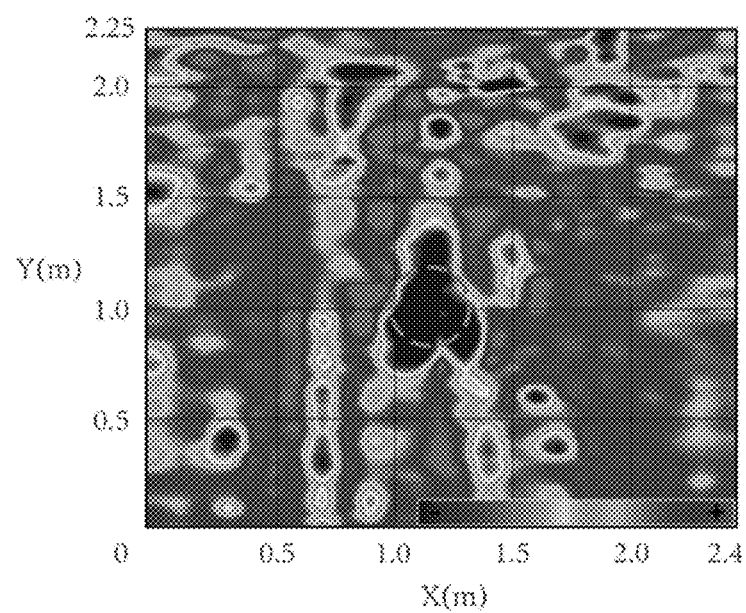
FIG. 11 is a slice map of amplitude attributes according to an embodiment of the present disclosure.

In a preferred embodiment of the present disclosure, attributes include coherent attributes, instantaneous attributes, frequency attributes and amplitude attributes. An attribute analysis profile and an attribute analysis type are determined according to a three-dimensional spatial information map constructed in step 3, and a corresponding attribute type is selected according to an Attribute module in an analysis function of the OpendTect. Firstly, the coherent attributes are applied to the horizontal profile to quantify the similarity of radar waveforms in axial and vertical directions, so as to acquire three-dimensional space information of pipe leakage and obtain a suspected leakage point, as shown in FIG. 8; secondly, the instantaneous attributes are applied to the longitudinal profile to highlight horizontally continuous slight changes, so as to accurately position leakage positions, as shown in FIG. 9; then the frequency attributes are applied to the transverse profile to obtain a spectrum with rich information, so as to help to further verify the leakage positions, as shown in FIG. 10; and finally, the amplitude attributes are applied to the horizontal profile to perform high-resolution imaging on leakage features, so as to determine the scale of pipe leakage, as shown in FIG. 11.

The technical solutions of the present disclosure are further described as follows with reference to the accompanying drawings.

Figure 4:
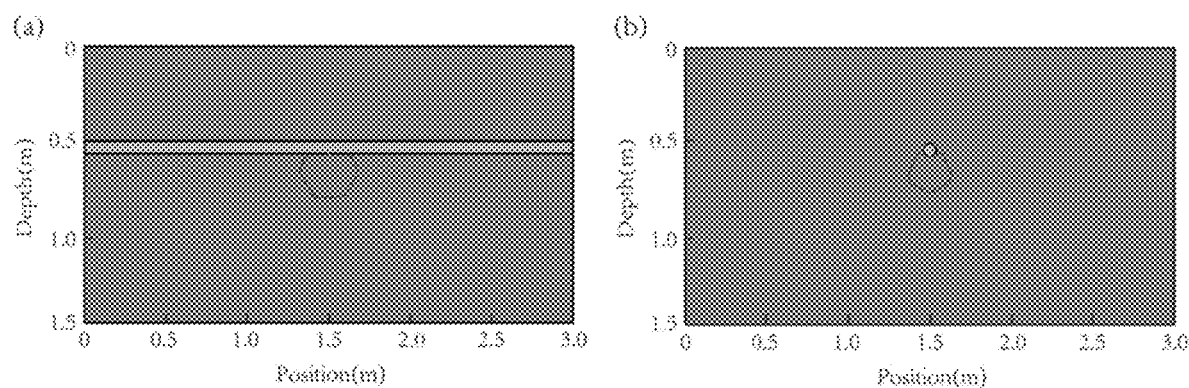
FIG. 4 is a schematic diagram of seepage simulation results according to an embodiment of the present disclosure.
Figure 4:
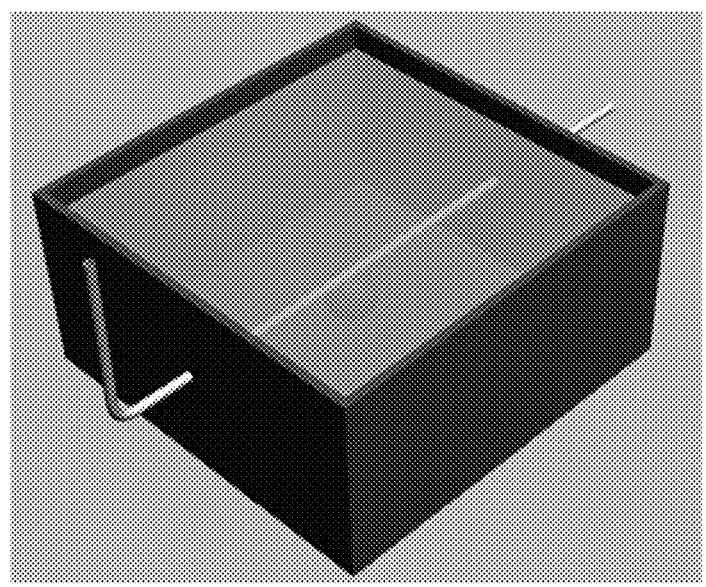

As shown in FIG. 4 to FIG. 11, a method for detecting leakage of a water supply pipe based on ground-penetrating radar three-dimensional image attribute analysis according to an embodiment of the present disclosure includes the following steps:

(1) A leakage model with leakage at the bottom of a pipe is established, including: the top of the pipe is buried at a depth of 0.5 m, the pipe diameter is 75 mm, the pipe is filled with water, the saturated volume water content of surrounding media is 0.35, a leakage hole is provided directly below a middle position of the pipe, and a constant pressure head is provided on an inner wall of the pipe. FIG. 4 shows 10-hour seepage simulation results, in which the straight line and the origin represent the pipe, and the dotted line area is a seepage area.

Figure 5:
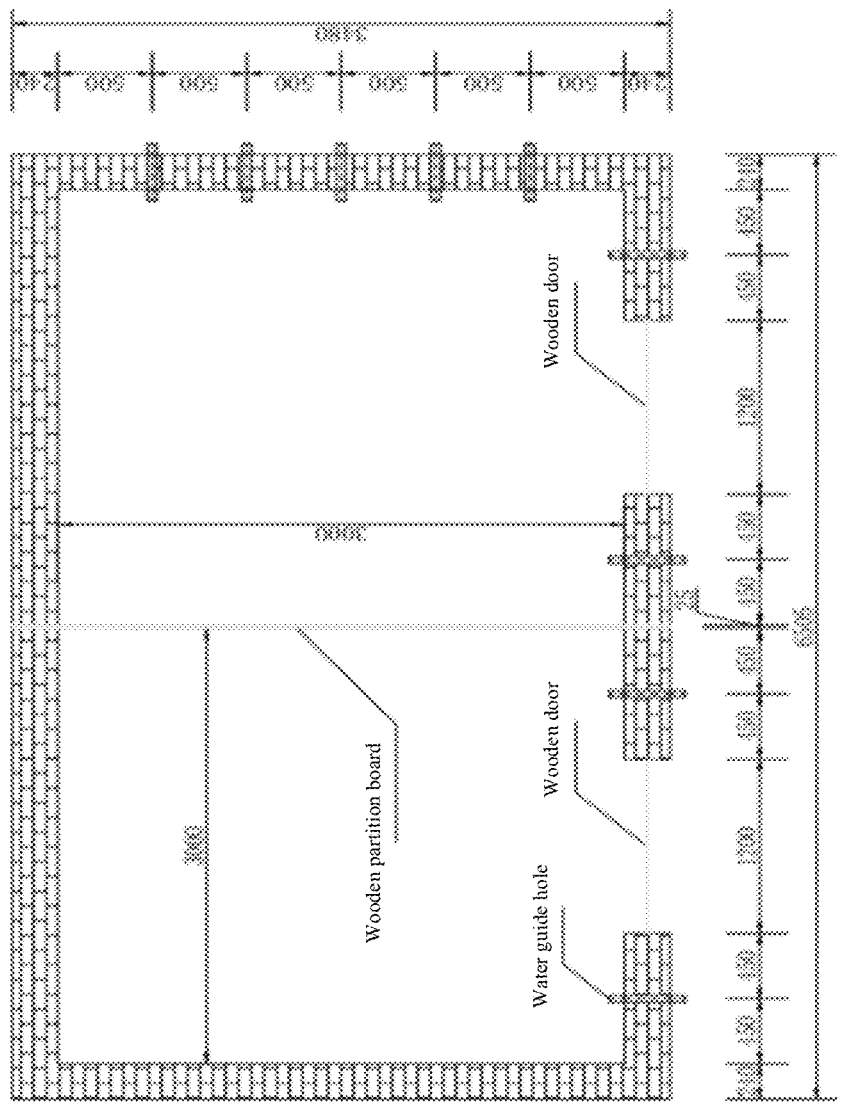
FIG. 5 is a schematic diagram of an experimental platform according to an embodiment of the present disclosure.

(2) FIG. 5 shows the establishment of two experimental platforms which is 1:1 with a seepage model on the basis of seepage simulation. The area of each platform is 3 m×3 m, a spherical center of a spherical leakage area is 11 cm from the bottom of the pipe, and the radius is 15 cm.

Figure 6:
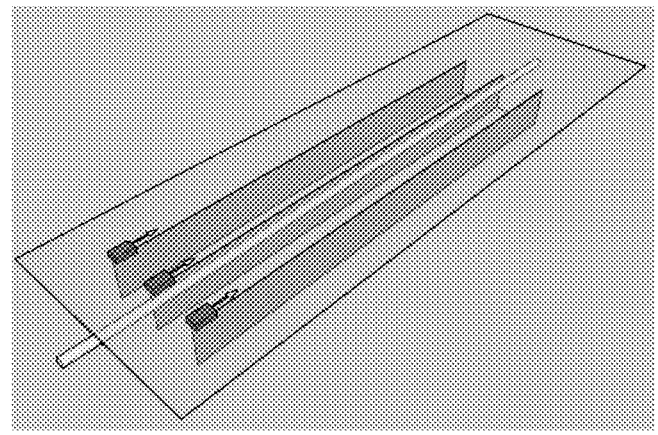
FIG. 6 is a schematic diagram of radar collection according to an embodiment of the present disclosure.

(6) FIG. 6 shows the completion of data collection by ground-penetrating radar.

(7) After the original data is obtained, all profiles are edited into the same time windows and distances, and basic processing is performed thereon, including DC removal, zero-time correction, amplitude enhancement and band-pass filtering.

(8) FIG. 7 shows fitting of a processed axial profile into a three-dimensional data body with high density in space by interpolation.

(9) The interpretation of the three-dimensional data body is completed by multi-attribute analysis. FIG. 8 shows analysis on coherent attributes, FIG. 9 shows analysis on instantaneous attributes, FIG. 10 shows analysis on frequency attributes, and FIG. 11 shows analysis on amplitude attributes.

The above are merely preferred embodiments of the present disclosure and are not intended to limit the present disclosure. Any modifications, equivalent replacements and improvements, etc. made within the spirit and principles of the present disclosure should all be included in the extent of protection of the present disclosure.

What is claimed is:

1. A method for detecting leakage of a water supply pipe based on ground-penetrating radar three-dimensional image attribute analysis, the method comprising:
    step 1 of acquiring ground-penetrating radar original image data of a water supply pipe by longitudinal scanning;
    step 2 of de-noising and filtering the acquired original image data;
    step 3 of fitting, by interpolation, the image data that has been processed into a three-dimensional data body; and extracting multiple planar or stereo image attributes, and displaying the image attributes by a longitudinal profile, a transverse profile, a horizontal profile, an irregular profile and iso-surface; and
    step 4 of identifying leakage positions and scale by multi-attribute comprehensive analysis,
    wherein said acquiring ground-penetrating radar original image data in the step 1 comprises: selecting a ground-penetrating radar antenna and pipe axial survey lines according to a burial depth and a pipe diameter;
    said acquiring ground-penetrating radar original image data comprises: selecting a ground-penetrating radar antenna and pipe axial survey lines; different pipe burial depths and pipe diameters correspond to ground-penetrating radar antennas with different center frequencies, a radar antenna model for the water supply pipe is calculated according to a pipe burial depth and a pipe diameter, and relations between a radar frequency, a horizontal resolution and a vertical resolution are shown in the following formulas:

$$\text{Reflection coefficient } R = \frac{\sqrt{\varepsilon_1} - \sqrt{\varepsilon_2}}{\sqrt{\varepsilon_1} + \sqrt{\varepsilon_2}}$$

$$\text{Horizontal resolution } R_f = \frac{1}{4}\sqrt{\frac{h\lambda}{2}}$$

$$\text{Vertical resolution } R_v = \frac{\lambda}{8} - \frac{\lambda}{4}$$

$$\text{Wave velocity } v = \frac{c}{\sqrt{\varepsilon}} = \lambda f$$

$$\text{Time } t = \frac{2h}{v}$$

and
    a position of a pipe axis is determined according to a position of a pipe orifice, and the antenna travels at a constant speed along the pipe axis from a starting pipe orifice to an ending pipe orifice, and then back to the starting pipe orifice;
    during a process of the antenna traveling at the constant speed along the pipe axis from the starting pipe orifice to the ending pipe orifice, and then back to the starting pipe orifice, the ground-penetrating radar antenna continuously transmits pulse electromagnetic waves to the water supply pipe as a detection target, and electromagnetic wave signals received by the ground-penetrating radar antenna are used as the ground-penetrating radar original image data.

2. The method for detecting leakage of a water supply pipe based on ground-penetrating radar three-dimensional image attribute analysis according to claim 1, wherein said de-noising and filtering the original image data in the step 2 comprises: removing DC, zero-time correcting, enhancing amplitude and band-pass filtering; and firstly, DC components of acquired original radar image signals are set to zero by using a Subtract-DC-Shift module in a one-dimensional filtering function of a universal radar processing software reflexw, so as to achieve a purpose of removing DC and removing zero drift; a first negative peak value or positive peak value of a direct wave is selected as a zero-time correction point by using a Move start time module in a static correction function of the reflexw, and the time of the position is set to 0; finally, the amplitudes of weak signals at depth are amplified by using an Energy decay module in a gain function of the reflexw, frequency signals within a particular range are selected by using a bandpassbutterworth module in the one-dimensional filtering function of the reflexw, high-frequency signals are allowed to pass to a maximum extent, and low-frequency signals are attenuated and suppressed.

3. The method for detecting leakage of a water supply pipe based on ground-penetrating radar three-dimensional image attribute analysis according to claim 1, wherein said fitting a three-dimensional data body in the step 3 comprises:

firstly, establishing a three-dimensional coordinate system of a radar image by using a software OpendTect based on an amount of to-be-imported radar image data, a total number of tracks of radar data and a total time duration of radar data; secondly, importing the radar image data that has been processed in the step 2 into the software;

then confirming arrangement pitch of the survey lines and a track pitch of the radar data during radar collection, inputting pitch-related parameters in a Manipulate module of the software OpendTect, and determining corresponding calculation functions; and finally, completing interpolation of the radar image data through a calculation command, and constructing a three-dimensional space information map of an underground pipe.

4. The method for detecting leakage of a water supply pipe based on ground-penetrating radar three-dimensional image attribute analysis according to claim 1, wherein said multi-attribute analysis in the step 4 comprises analysis on coherent attributes, instantaneous attributes, frequency attributes and amplitude attributes; and an attribute analysis profile and an attribute analysis type are determined according to a three-dimensional space information map constructed in the step 3, and a corresponding attribute type is selected according to an Attribute module in an analysis function of the OpendTec; firstly, the coherent attributes are applied to the horizontal profile to quantify similarity of radar waveforms in axial and vertical directions, so as to acquire three-dimensional space information of pipe leakage and obtain a suspected leakage point; secondly, the instantaneous attributes are applied to the longitudinal profile to highlight horizontally continuous slight changes, and then the frequency attributes are applied to the transverse profile to obtain a spectrum with rich information.

5. A ground-penetrating radar image processing system using the method for detecting leakage of a water supply pipe based on ground-penetrating radar three-dimensional image attribute analysis according to claim 1.

* * * * *